United States Patent

Kunitake et al.

Patent Number: 5,500,907
Date of Patent: Mar. 19, 1996

[54] IMAGE SIGNAL ANALYZING SYSTEM

[75] Inventors: Setsu Kunitake; Koh Kamizawa; Yutaka Koshi; Kazuhiro Suzuki, all of Kanagawa, Japan

[73] Assignee: Fuji Xerox Co., Ltd., Tokyo, Japan

[21] Appl. No.: 903,284

[22] Filed: Jun. 24, 1992

[30] Foreign Application Priority Data

Jun. 25, 1991 [JP] Japan .................................. 3-202129

[51] Int. Cl.$^6$ .................................. H04N 11/02
[52] U.S. Cl. .................. 382/240; 382/253; 348/417
[58] Field of Search .................. 382/16, 21, 37; 358/136; 348/417, 409

[56] References Cited

U.S. PATENT DOCUMENTS

| | | | |
|---|---|---|---|
| 4,375,654 | 3/1983 | Evans et al. | 382/21 |
| 4,710,812 | 12/1987 | Murakami et al. | 348/417 |
| 4,771,467 | 9/1988 | Catros et al. | 382/37 |
| 4,813,078 | 3/1989 | Fujiwara et al. | 382/21 |
| 4,878,230 | 10/1989 | Murakami et al. | 348/417 |
| 4,908,872 | 3/1990 | Toriu et al. | 382/21 |

FOREIGN PATENT DOCUMENTS 2-6472(B2)  2/1990  Japan .

OTHER PUBLICATIONS

Dionysian et al, "Variable Precision Representation for Efficient VQ Codebook Storage" Mar. 1992 pp. 319–328.
Design Method of Binary Tree Search Codebook, H. Watanabe et al., 1988. pp. 931–937.
Speech Coding Based Upon Vector Quantization, A. Buzo et al., IEEE Transactions On Acoustics, Speech, And Signal Processing, vol. ASSP–28, No. 5, Oct. 1988. pp. 562–574.
Andres Buzo et al., "Speech Coding Based Upon Vector Quantization," IEEE TRANSACTIONS ON ACOUSTICS, SPEECH AND SIGNAL PROCESSING, Vol. ASSP-28, No. 5, October 1980, pp. 562–574.

*Primary Examiner*—Leo Boudreau
*Assistant Examiner*—Chris Kelley
*Attorney, Agent, or Firm*—Finnegan, Henderson, Farabow, Garrett & Dunner

[57] ABSTRACT

An image signal analyzing system capable of accomplishing shape analysis for processing or coding an image with easy, by space division using two orthogonal representative vectors, or by differential representative vectors given by the difference between representative vectors. With such a system, inner products between mean separated blocks produced by a mean separated unit and a differential representative vector set stored in a memory in advance are computed by inner product computing unit disposed into a binary tree shape having n stages. Positive/negative signs expressing resulting inner products in the respective stages of the binary tree computed by the inner product computing unit are held, as indexes, by n index holding means sequentially, and an index representing the shape of input image information is obtained from the n indexes held by the index holding unit.

11 Claims, 7 Drawing Sheets

FIG. 10  VERTICAL DIRECTION (V)

FIG. 11  HORIZONTAL DIRECTION (H)

FIG. 12  LEFT SLANT DIRECTION (SL)

FIG. 13  RIGHT SLANT DIRECTION (SR)

FIG. 14  SECOND-ORDER HARMONIC VERTICAL DIRECTION (V2)

FIG. 15  SECOND-ORDER HARMONIC HORIZONTAL DIRECTION (H2)

IMAGE SIGNAL ANALYZING SYSTEM

BACKGROUND OF THE INVENTION

1. Field of the Invention

The present invention relates to an image signal analyzing system for analyzing a shape of an image to be processed or coded on the basis of the shape of the image.

2. Description of the Related Art

As a method of coding image information, there has been a vector quantization method in which a plurality of signals are not quantized separately but divided into blocks of (k×l) pixels (k and l being integers not smaller than 1), and each block is regarded as a (k×l) dimensional vector, and expressed as a single code.

In this vector quantization method, a vector set (therein after referred to as "codebook") constituted by a plurality of (k×l) dimensional representative vectors is prepared, and a representative vector which is closest to an input vector is selected from this codebook by pattern matching between the input vector and the representative vector. The most basic vector quantization is a full search vector quantization for performing pattern matching between an input image block and all of the representative vectors in a codebook. In this case, a full search vector quantization method including a codebook constituted by n representative vectors is required to perform pattern matching n times, resulting in the time for searching the codebook being prolonged if the scale of the codebook is large.

In a effort to solve the foregoing problem, there has been proposed a binary tree search method in Which a codebook is arranged into a tree shape, and pattern matching between an input vector and vectors in each stage is performed stage by stage sequentially from the first stage. According to this measure, the number of times of pattern matching can be made to be $\log_2 n$. However, in the vector quantization searching by use of a binary tree, if judgment at the time of performing the above-mentioned pattern matching is once mistaken, there is a possibility of obtaining a result different from that by the above-mentioned n-times pattern matching. In the vector quantization using a binary tree, therefore, there has been a problem that it is difficult to design a general-purpose codebook, and the performance is often deteriorated.

In order to solve the foregoing problem, various measures of designing a codebook have been proposed.

Figure 17:
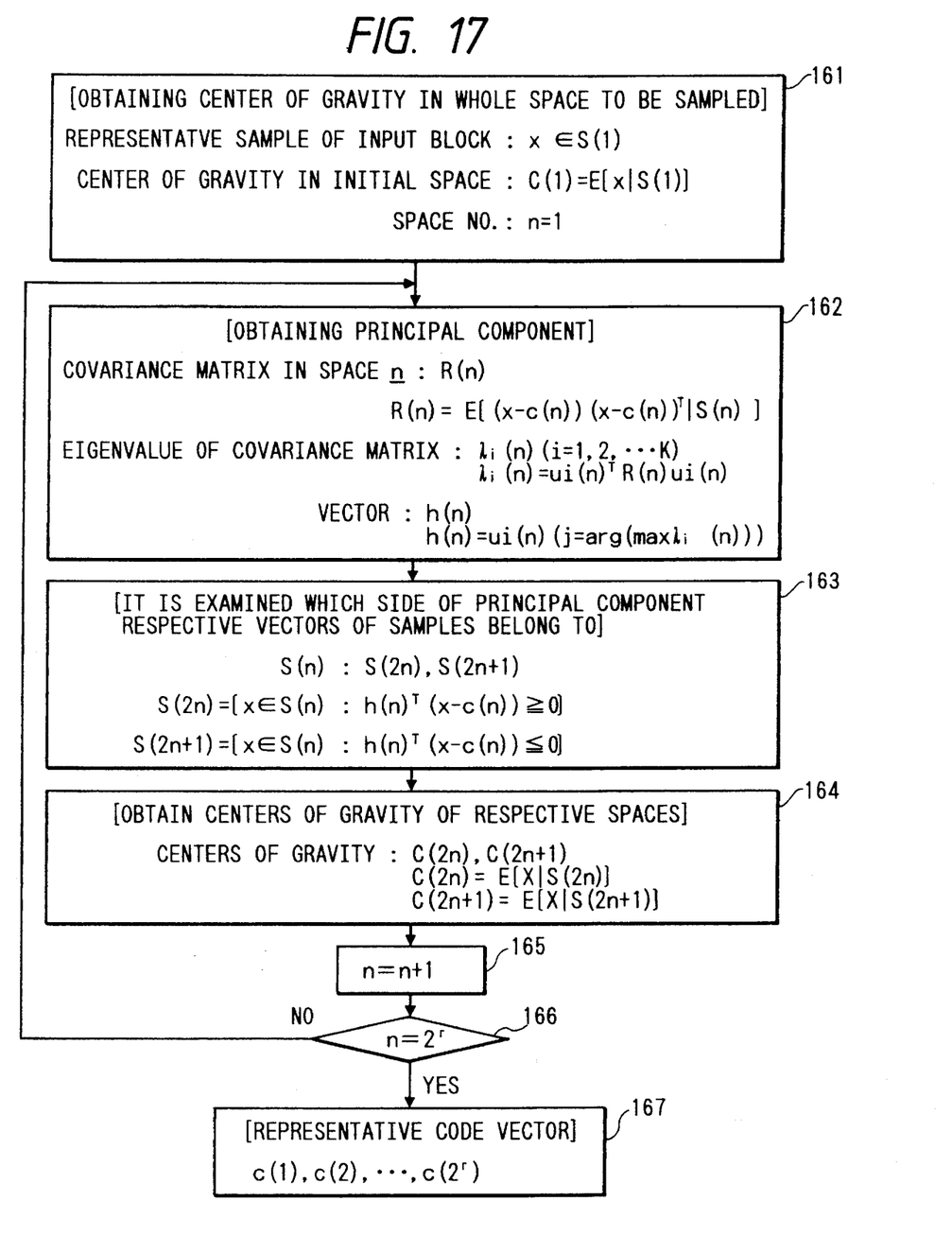
FIG. 17 is a flowchart for explaining an algorithm in the conventional system which is used for obtaining a codebook having representative vectors.

By way of example, a conventional example of a method of designing a codebook will be described. FIG. 17 shows a flow chart explaining an algorithm in a conventional example to obtain a codebook constituted by representative vectors. Representative samples of an input block (referred to as "training series") are normalized in advance. The normalized samples are defined to be a sample group distributed on a unit super-sphere (a step 161). Next, a principal component as an axis for dividing the normalized samples is obtained (a step 162). By applying a well-known principal component analysis, the above-mentioned sample group on the unit super-sphere is divided into two by use of a super-plane defined with the most contributory vector, that is, a first principal component vector. It is examined which side of the above-mentioned principal component respective vectors of the samples on the unit super-sphere belong to (a step 163). Next, the center of gravity of the respective vectors of the samples is obtained in each of divisional spaces (a step 164). In addition, it is decided in advance that the number of divisional spaces is $2^r$, and the number of time of repeating the operation of division is n, and 1 is added to n whenever this operation of division has been performed once (a step 165). Next, it is examined whether n has reached $2^r$ or not. If n has not reached $2^r$, the operation of dividing a space is repeated n times (a step 166). As a result of the repetition $2^r$ times of the above-mentioned operation of division, representative vectors are obtained (a step 167). A binary tree codebook is designed in this manner. The details of the algorithm shown in the above-mentioned flowchart has been disclosed in Watanabe et al., "Method of Designing a Binary Tree Search CodeBook", Papers of Institute of Electronics, Information and Communication Engineers of Japan.

Figure 16:
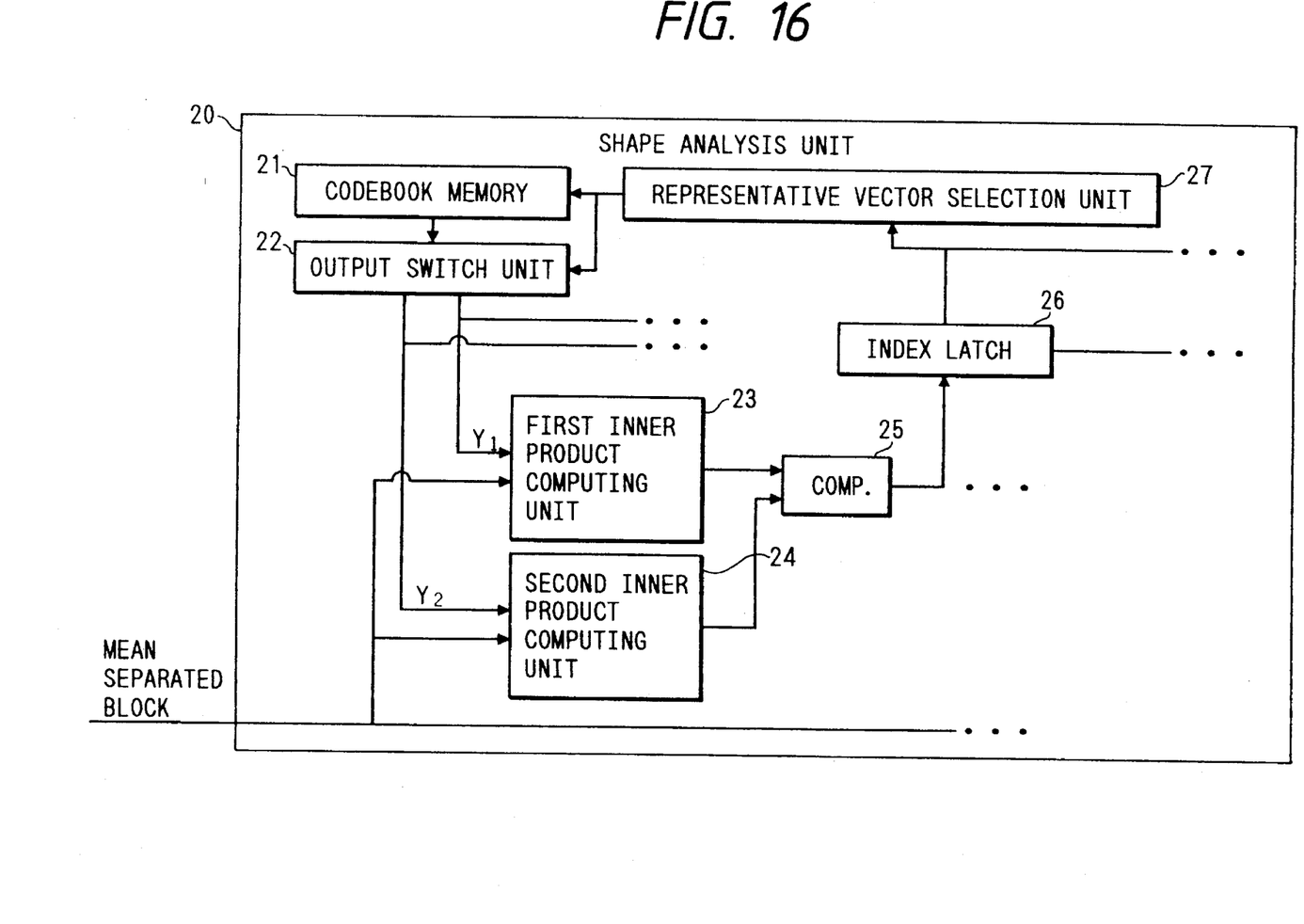
FIG. 16 is a block diagram of a shape analysis unit of a conventional image signal analyzing system.

FIG. 16 is a block diagram illustrating a shape analysis unit using a codebook designed according to a conventional method. In FIG. 16, a shape analysis unit 20 includes a codebook memory 21 for storing representative vectors, an output switch unit 22 for supplying a representative vector read from the codebook memory 21 to an inner product computing unit in a predetermined stage, first and second inner product computing units 23 and 24 for computing inner products between representative vectors and a mean separated block, a comparator 25 for comparing the respective sizes of the results computed by the first and second inner product computing portions 23 and 24, an index latch 26 for holding a sign expressing the size compared by the comparator 25, and a representative vector selection unit 27 for generating an address for selecting a representative vector stored in the codebook memory 21 on the basis of the sign held by the index latch 26, and giving an instruction of switch to the output switch unit 22.

The first inner product computing unit 23 computes an inner product between a mean separated block in which a mean of an input block extracted from an input image is separated, and a representative vector $Y_1$ obtained in advance by the procedure of FIG. 17 and stored in the codebook memory 21. In the same manner, the second inner product computing unit 24 computes an inner product between the mean separated block and a representative vector $Y_2$ obtained in advance by the procedure of FIG. 17 and stored in the codebook memory 21.

After that, the results of the inner products computed by the respective inner product computing units 23 and 24 are compared with each other by the comparator 25. The respective sizes of the representative vectors $Y_1$ and $Y_2$ are judged by the output of the comparator 25. A positive or negative sign obtained thus is held by the index latch 26 sequentially, for example, as "1" or "0", and is used for computing inner products in the next stage. That is, the representative vector selection unit 27 reads the sign of the index latch 26, and assigns the address of representative vectors stored in the codebook memory 21 as well as the inner product computing units 23 and 24 corresponding to a predetermined stage in the output switch unit 22 on the basis of this read sign.

Next, representative vectors stored in the codebook memory 21 the address which have been assigned by the representative vector selection unit 27 are read, and at the same time the output switch unit 22 is switched to supply the representative vectors to the inner product computing units 23 and 24 in the stage assigned by the representative vector selection unit 27. The respective sizes of inner products are compared with each other in the same manner as mentioned above, and an index thereof is held by the index latch 26. In the same manner, such an operation is repeated up to the n-th stage set in the codebook, so that the results of coding of the input block can be obtained in the index latch 26.

By the way, a codebook designed by a method as shown in FIG. 17 expresses only waveform (shape) information normalized into mean 0 and dispersion 1, which is called "Shape". It is therefore necessary to obtain the mean and dispersion of an input block other than "Shape" when vector quantization is performed. On the other hand, since the codebook has the mean 0 and the dispersion 1, pattern matching can be realized by a maximum inner product regulation in which inner product values between the input block and the codebook constituted by representative vectors are obtained, and a representative vector making its inner product value large is selected as a high-approximate representative vector.

In addition, an approximate value of dispersion is obtained from the inner product value, called "Gain". The larger the difference between the codebook constituted by representative vectors and the input vectors is, i.e., the larger mismatching is, the smaller the "Gain" is. Thus, the use of the "Gain" makes it possible to perform a pattern matching operation and attenuate the distortion of quantization by a single operation. This method has been called "Gain"/"Shape" VQ, and reported in the paper by Buzo et al., entitled "Speech coding based upon vector quantization", and described in IEEE Trans. on Acoust.

However, such a method of designing a codebook as shown in FIG. 17 is a method for general binary tree search quantization, so that the following problems have been produced in the case of performing "Shape" analysis by use of a codebook designed by this method.

(1) Representative vectors obtained by repeating the operation of dividing a signal space into two along a super-plane test algorithm by use of a conventional system are obtained newly, while centers of gravity in respective stages are obtained, so that the representative vectors are not on a super-sphere. That is, quantized representative vectors obtained in the last stage are not normalized with respective to Gain. It is therefore necessary to normalize the representative vectors with respective to "Gain" newly after the operation of dividing spaces is finished, so that procedures for designing a codebook are made complicated.

(2) The new representative vectors obtained while centers of gravity in respective stages are obtained as above mentioned, are not ideal "for pixel values to increase or decrease monotonously in a certain predetermined direction". Therefore, the vectors cannot always "express Shape of a block". For example, there is a case where representative vectors are such that it is difficult to read the increase/decrease of pixel values. This results in a block having no meanings on shape.

It is difficult to use such representative vectors for "Shape" analysis.

(3) Since a codebook designed by use of a conventional system must store in it all of representative vectors divided by a super-plane, the quantity of a memory for the codebook becomes large, so that there has been a problem on the economy of realized memory scale and so on for using the code book for "Shape" analysis.

SUMMARY OF THE INVENTION

The present invention has as one if its objects to solve the foregoing problems, and has another object to provide an image signal analyzing system which can design a code book simply and can perform shape analysis. In addition, the present invention has another object to provide an image signal analyzing system by which a memory for a code book used for the above-mentioned image analysis can be reduced in scale.

In order to attain the foregoing objects, the image signal analyzing system according to the present invention comprises: a block extracting means for sequentially extracting blocks including a predetermined number of pixels from an input image, a storage means for storing a set of differential representative vectors obtained by finding the difference between representative vectors in every stage of a binary tree having a plurality of stages of the representative vectors, a plurality of stages of inner product computing means for performing computation of inner products between the extracted blocks and the respective differential representative vectors of the plurality of stages, and an inner product result holding means for holding results of the inner products obtained for every stage of the binary tree by the inner product computing means, as an index expressing a shape of the input image.

The above image signal analyzing system is characterized in that when inner products between the mean separated block and the n stages of a differential representative vector set are computed by the inner product computing means, representative vectors constituting the differential representative vector set are defined to be vectors of a shape having a predetermined stepwise gradient, and values of elements of a required representative vector are approximated by a power of 2.

An input image is divided into blocks of (j×k) pixels. That is, a block extracting means extracts blocks of pixels from the input image sequentially. The respective extracted input blocks are made to be mean separated blocks by an average value separating means to separate their means therefrom. On the other hand, representative vectors which have the same size as the input blocks and in which means inside the input blocks are separated and their dispersions are normalized, are arranged in a binary tree of n stages (n is a predetermined positive integer not smaller than 1) in advance. Differential representative vectors constituted by differences between the above-mentioned representative vectors in the respective stages of this binary tree are stored in the storage means. Then inner products between the differential representative vectors of the respective stages stored in the storage means and the above-mentioned mean separated blocks are computed by the inner product computing means sequentially. Positive/negative signs obtained by the inner product results of the respective stages of the binary tree computed by the inner product computing means are held by n inner product result holding means sequentially. On the basis of the inner product result of a certain stage, the selection means assigns an address of the storage means to select a differential representative vector used for the next stage.

An inner product operation is performed with the selected differential representative vector in the next stage, and such an operation is executed and repeated up to the last stage. N bits of the inner product results held by the inner product result holding means express the shape of the input image information. Since the n bits of the inner product results express the shape of the input image information, there is an advantage if the n bits of the inner product results are used for compressing image data or the like.

In addition, according to the present invention, inner product operations are performed with differential values of representative vectors, so that the number of operations are reduced, and the speed of processing is improved. That is, while it has been conventionally necessary to perform inner product operations between two representative vectors and input blocks and a comparison operation of the results of the inner product operations in each stage as shown in FIG. 16, it is necessary to perform only one inner product operation in each stage according to the present invention.

In addition, representative vectors prepared to obtain a differential representative vector set and shaped into a binary tree as mentioned above are established in advance to express two directions perpendicular to each other and expressing space directions of an image. For example, used are vertical and horizontal directions perpendicular to each other, left-inclined and right-inclined directions perpendicular to each other, or second-order vertical and horizontal directions in which values of components in vectors do not increase monotonously but increase and decrease twice. Since a space is divided by these orthogonal vectors, it is possible to perform shape analysis.

Further, if representative vectors are defined to be shaped to have a predetermined stepwise gradient when inner products between the mean separated blocks and the n stages of a differential representative vector set are computed by the inner product computing means, it is possible to approximate values of elements of the representative vectors into powers of 2. In such a case, since the representative vectors are approximated into powers of 2, the inner product computation between the differential representative vector set and the mean separated blocks can be realized by shift operations and additions of binary numbers.

Further, if differential representative vectors divided by a super-plane are symmetrical, only one of symmetrical differential representative vectors is stored in a differential vector set storage means for every stage in advance. Therefore, the differential representative vector is multiplied by a negative number on the basis of an index obtained by the result of an inner product operation, so that the other of the differential representative vectors can be obtained. Since one differential representative vector stored in the storage means is multiplied by a negative number to obtain the other differential representative vector, it is possible to reduce into a half of the storage capacity to store a differential representative vector set in the storage means.

DESCRIPTION OF THE PREFERRED EMBODIMENTS

Figure 1:
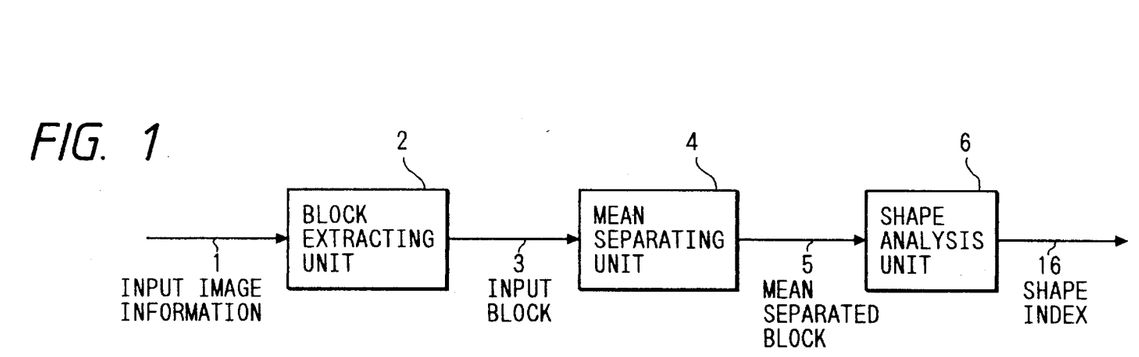
FIG. 1 is a block diagram showing an embodiment of the image signal analysis system according to the present invention.
Figure 2:
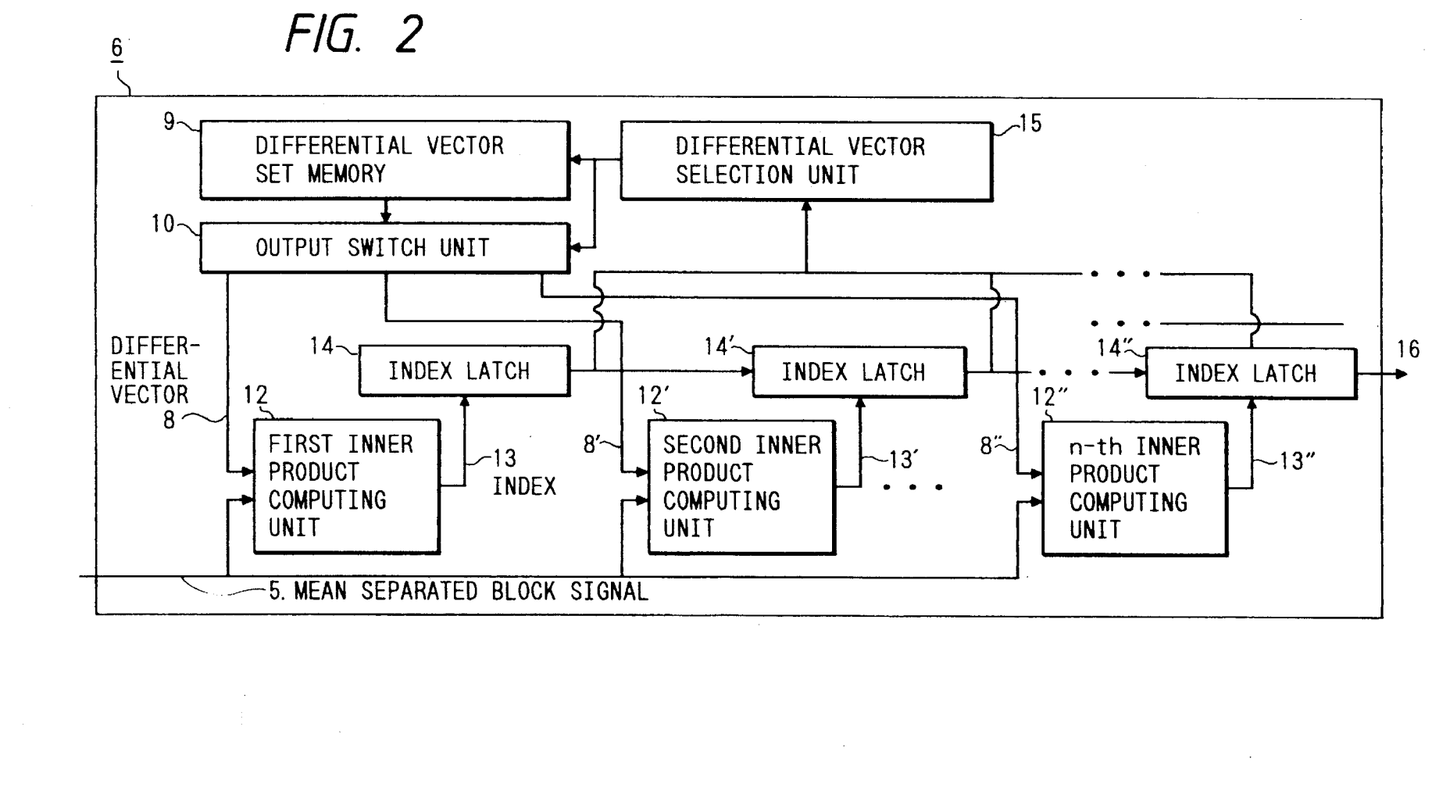
FIG. 2 is a block diagram showing an example of a shape analysis unit of FIG. 1 in detail.

FIG. 1 is a block diagram showing an embodiment of an image signal analysis system according to the present invention. FIG. 2 is also a block diagram showing an example of a shape analysis unit of FIG. 1.

In FIG. 1, the image signal analysis system according to the present invention is constituted by a block extracting unit 2 for forming an input block signal 3 of (k×l) pixels from an input image information 1 supplied thereto, a mean separating unit 4 for separating a mean of the input block signal 3 extracted by the block extracting unit 2 and a shape analysis unit 6 for analyzing the "Shape" of a mean separated block signal 5 generated in the mean separating unit 4 to thereby obtain a shape index 16 of a representative vector.

In FIG. 2, the shape analysis unit 6 includes a differential vector set memory 9 for storing previously prepared differential vector sets; an output switch unit 10 for sending a difference vector previously prepared by the differential vector set memory 9 to a predetermined inner product computing unit; n stages of inner product computing (a first inner product computing unit 12, a second inner product computing unit 12', ... an n-th inner product computing unit 12") for computing an inner product of a differential vector 8 and the means separated block 5 which is obtained from an input image; index latches 14, 14', ..., 14" for holding indexes 13, 13', ..., 13" successively obtained from the n stages of inner product computing units 12, 12', ..., 12" respectively; and differential vector selection unit 15 for selecting the differential vector stored in the differential vector set storage unit 9 and for supplying a switch instruction to the output switch unit 10 on the basis of signs held in the index latches 14, 14', ..., 14" respectively.

Here, the term "vector set" corresponds to the term "codebook" described in the prior art, and is constituted by representative vectors in the desired predetermined number, for example, 32 or 64. Further, the term "differential vector" means a difference between two representative vectors corresponding to two spaces obtained by dividing a space by use of two planes which cross perpendicularly to each other and which will be described later. In this specification, the term "vector set" and the term "differential vector" are defined as described above.

The first inner product computing unit 12 computes an inner product between the mean separated block 5 in which the average value of the input blocks extracted from the input image is separated, and the differential vector 8 which is previously obtained in the process shown later in FIG. 5 and which is stored in the differential vector set memory 9.

In the results of the inner product computation by the first inner product computing unit 12, a difference between vectors is obtained, so that the relationship in size can be simply judged. A positive or a negative sign obtained as the result is successively held, for example, as an index "1" or "0", in the index latch 14. The differential vector selection unit 15 reads the sign of the index 13, and designates the address of the differential vector stored in the differential vector set memory 9 on the basis of the read sign, and at the same time, the output switch unit 10 designates the inner product computing unit 12' in the next stage.

As a result, the inner product computing unit 12' in the next stage computes the inner product between the second-stage differential vector sent from the differential vector set memory 9 and the mean separated block 5. The thus computed inner product is held as an index 13' in the index latch 14'. Such operation is similarly repeatedly performed up to the n-th stage determined by the differential vector set so that the result of coding of the input block is obtained in the index latch 14".

Figure 3:
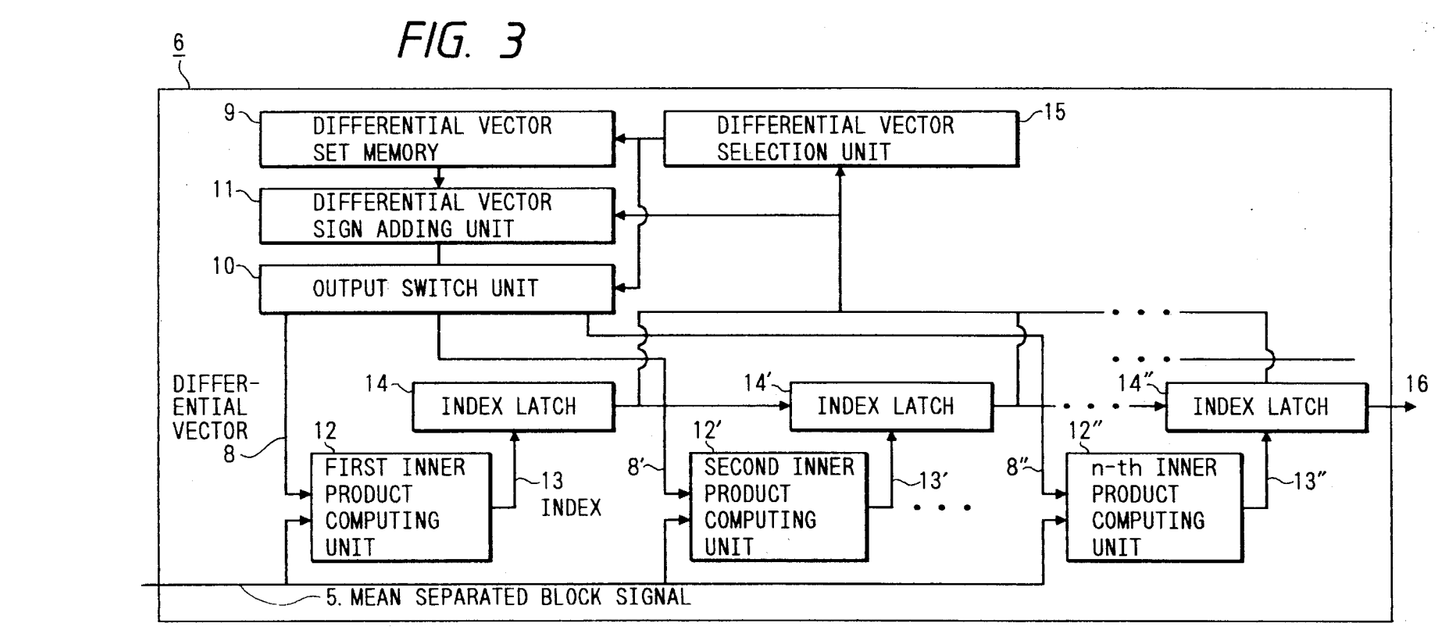
FIG. 3 is a block diagram of another example of the shape analysis unit of FIG. 1.

Further, another embodiment is illustrated in FIG. 3. This embodiment of FIG. 3 is different from the that shown in FIG. 2 in that a differential vector sign adding unit 11 is additionally provided between the differential vector set storage unit 9 and the output switch unit 10. In this embodiment, in the case where differential representative vectors divided through a space are symmetrical to each other, the differential vector selection unit 15 designates the address of the differential vector stored in the differential vector set memory 9 on the basis of the index 13 held in the index latch 14, and designates an inner product computing unit in a predetermined stage in the output switch unit 10. Further, based on the index held in the index latch 14, the differential vector sign adding unit 11 gives a "positive" or a "negative" sign to the differential vector in the differential vector set memory 9. Thus, the differential vector is sent to the inner product computing unit so that an inner product is computed from the differential vector set memory 9, and the computed inner product becomes an index. Accordingly, in the case where differential representative vectors are symmetrical to each other, the storage capacity for the differential vector set to be stored in the differential vector set memory 9 can be reduced to a half by the provision of the differential vector sign adding unit 11.

Figure 5:
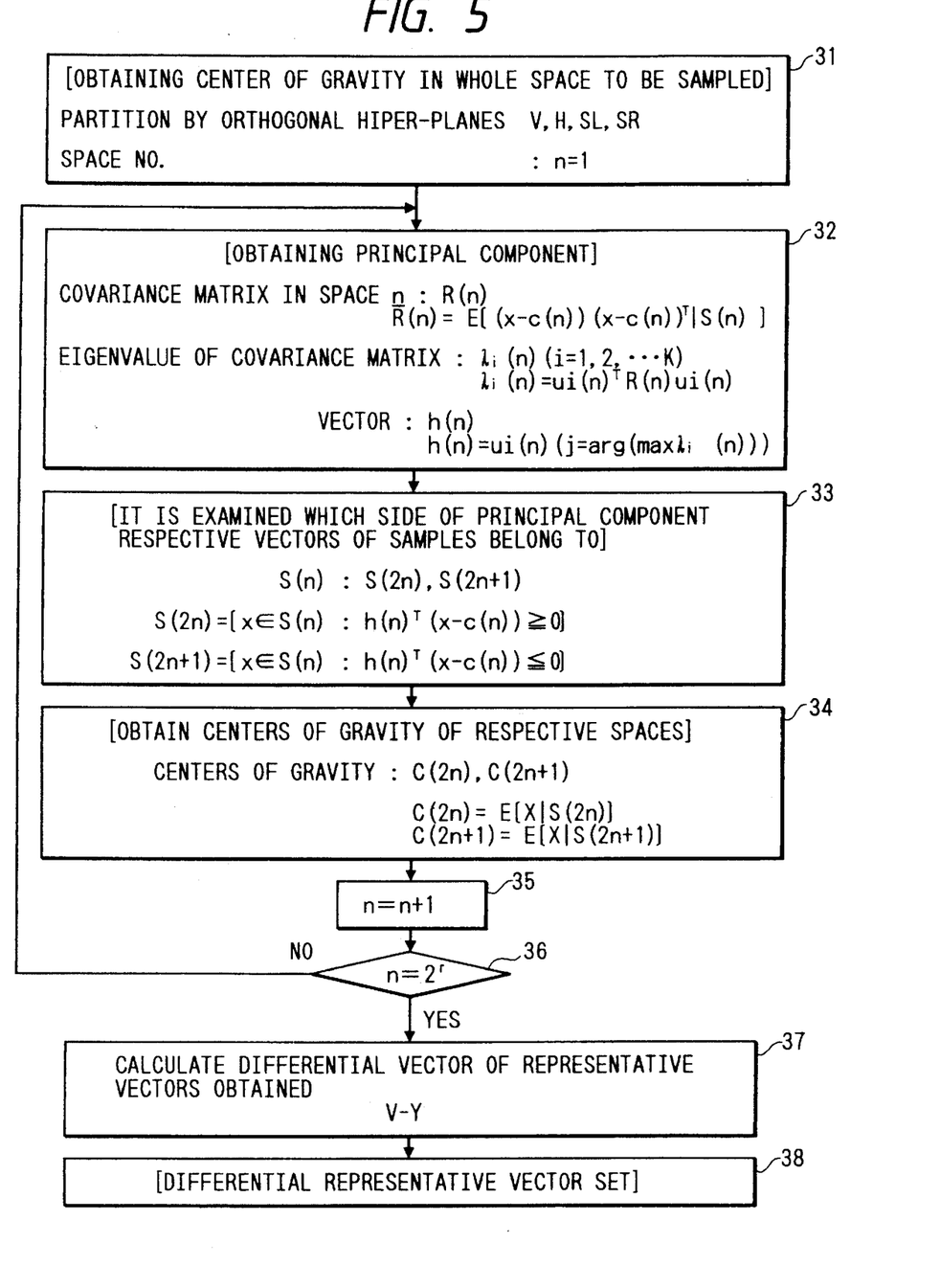
FIG. 5 is a flowchart for explaining an algorithm for a representative vector set in the embodiment of the present invention.

FIG. 5 is a flowchart for explaining an algorithm for obtaining representative vectors in the embodiment of the present invention. The above flowchart is different from that in the conventional one shown in FIG. 17 in the manner of setting an initial value. That is, in the whole space division performed in the first stage, for example, two orthogonal horizontal and vertical vectors V and H are preset, and then division is performed from the next stage (a step 31). In the process from the next step 32 to a step 36, the steps are performed similarly to the process from the step 162 to the step 166 in FIG. 17. The thus obtained difference between representative vectors is computed to obtain a differential representative vector. The thus obtained differential representative vector is generated through the above process and is stored in the differential vector set storage means 9 in advance.

The operation of the image signal analysis system according to the present invention will be described hereunder. In FIG. 1, the supplied input image information 1 is extracted to form the input block signal 3 of (k×l) pixels by the block extracting unit 2. A mean is separated from the input block signal 3 by the means separating unit 4 to form the mean separated signal 5. For example, in the case where the number of the pixels of the input block signal is k=l=4, the mean and the pixel value are expressed in the following equations 1 and 2.

$$\mu = (\Sigma_{(i)} \Sigma_{(j)} \Sigma_{(ij)})/4 \times 4 \quad (1)$$

where $\Sigma_{(i)}$ represents the total sum from i=1 to i=4, and $\Sigma_{(j)}$ represents the total sum from j=1 to j=4.

$$X'_{ij} = X_{ij} - \mu \quad (2)$$

In the above equations 1 and 2, $X_{ij}$ represents each pixel value (i, j=1,2,3,4) of the input image information 1, $\mu$ represents the mean of the pixel values in the block, and $X'_{ij}$ represents the pixel value in which the mean is separated. The mean separated signal 5 produced from the mean separating unit 4 is supplied to the shape analysis unit 6 to thereby obtain the shape index 16 which is the "Shape" information of the input block signal 3.

In the shape analysis portion 6 shown in FIG. 2, an inner product between the mean separated block 5 and the differential representative vector 8 is computed by the inner product computing portion 12. That is, the computation of the inner product is executed according to the following equation (3).

$$X \cdot Y = x_{11}y_{11} + x_{12}y_{12} + \cdots x_{44}y_{44} \quad (3)$$

In the equation (3), X, Y, $x_{ij}$, and $y_{ij}$ represent the mean separated block 5, the differential representative vector 8, a component of the mean separated block X, and a component of the differential representative vector Y respectively. The index 13 indicating the positive/negative sign of an inner product value is produced from the result of the inner product computation in the inner product computing unit 12. The indexes 13 are held, for example in the shape of "1" or "0", in the index latch 14, 14', . . . 14". Accordingly, a shape index 16 of n bits is produced from the n-th stage shape analysis unit 6. In the case where image information is scanned, there is no particular problem even if the image information is scanned from any direction, vertically or transversely, so that a vertical vector V and a horizontal vector H which are most easily considerable are selectively fixed for the first stage differential representative vectors. For the first stage, alternatively, analysis may be performed by use of a vector SL in the left slant direction and a vector SR in the right slant direction as two vectors perpendicular to each other without using the horizontal and vertical vectors.

Figure 4:
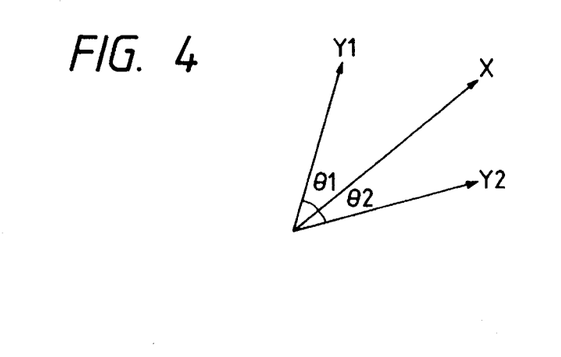
FIG. 4 is a diagram showing a principle that pattern matching of a vector X and two representative vectors $Y_1$ and $Y_2$ can be realized by one inner product computation.

Referring to FIG. 4, it will be described that "Shape" analysis of the input block 3 can be realized through the computation of the inner product. FIG. 4 is a theoretical view showing that pattern matching of a vector X and two representative vectors $Y_1$ and $Y_2$ can be realized through once computation of the inner product. In FIG. 4, the vector X represents the mean separated block 5, and the vectors $Y_1$ and $Y_2$ represent representative vectors in each stage of a binary tree. The representative vectors $Y_1$ and $Y_2$ are normalized in mean separation as shown in the following equations (4) and (5). "μ" represents an average pixel value in a block.

$$|Y_1|=|Y_2|=|Y|=1 \text{ (dispersion } \sigma=1) \quad (4)$$

$$\mu=(\Sigma_{i(k)}\Sigma_{j(l)}y_{ij})/(k \times l)=0 \quad (5)$$

where $\Sigma_{i(k)}$ represents the total sum from i=1 to i=k, and $\Sigma_{j(l)}$ represents the total sum from j=1 to j=1.
That is, the representative vectors $Y_1$ and $Y_2$ are distributed on a super-sphere, so that in order to judge which of the vectors $Y_1$ and $Y_2$ the vector X is nearer to, it will do to examine the angles $\theta_1$ and $\theta_2$ formed between the vector X and the vector $Y_1$ and between the vector X and the vector $Y_2$. In order to judge which one of the $\theta_1$ and $\theta_2$ is larger, it will do to use new consideration of a differential vector $(Y_1-Y_2)$ to thereby execute the computation of the inner product as shown in the equation (6).

$$X(Y_1-Y_2)=|X||Y|(\cos\theta_1-\cos\theta_2) \quad (6)$$

Figure 9:
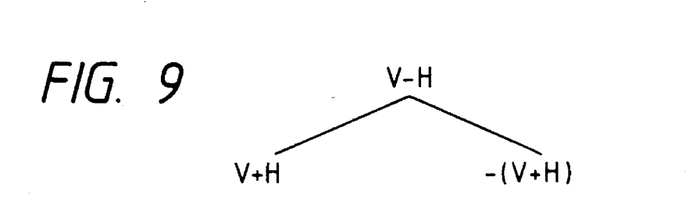
FIG. 9 is a diagram showing a tree of the differential vector set obtained from the tree of the representative vector set in FIG. 8.
Figure 14:
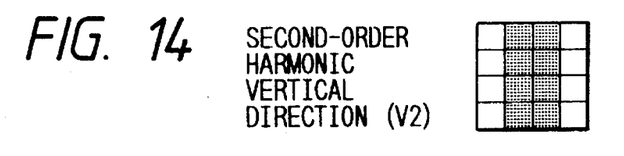
FIG. 14 is a diagram showing a shape example of a representative vector defined as the second-order vertical direction showing the two-dimensional directional component of an image in the case of k=4 and l=4.

As a result, it can be said that if the inner product value is positive, the vector X is near to the representative vector $Y_1$ because the relation of $$\theta_1 > \theta_2 \quad (7)$$

is established. If the inner product value is negative, on the contrary, the vector X is near to the representative vector $Y_2$. In this measure, in order to realize the search in each of the stages of the binary tree, the times of execution of the four arithmetic operations, including addition, subtraction, and multiplication, is (6kl−1) times for every (k×l) input block 3 in the conventional system. On the other hand, according to this embodiment, (2kl−1) times of only multiplication and addition are sufficient. Further, in the representative vectors in this embodiment, the pixel values change stepwise as shown in FIGS. 9 and 14 as will be described later. Accordingly, it can be defined that the representative vectors are vectors each having a shape having a predetermined stepwise slant. Accordingly, the representative vectors having the shapes each having such a predetermined stepwise slant can be approximated in powers of 2. When such approximation is performed, the inner product computation of the representative vectors and the input block 3 can be realized through only the shift operation and addition of binary numbers.

Figure 6:
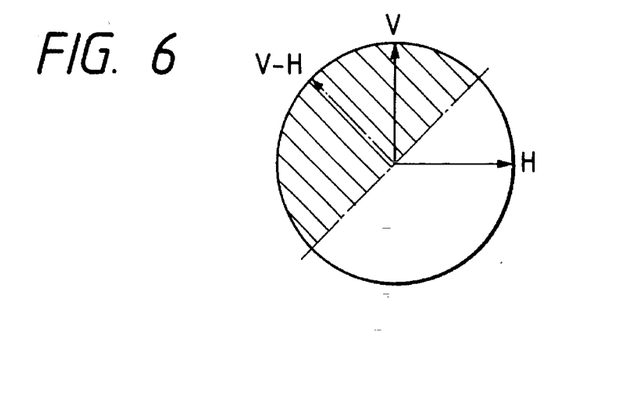
FIG. 6 is a diagram showing an example of division of a binary tree space.
Figure 7:
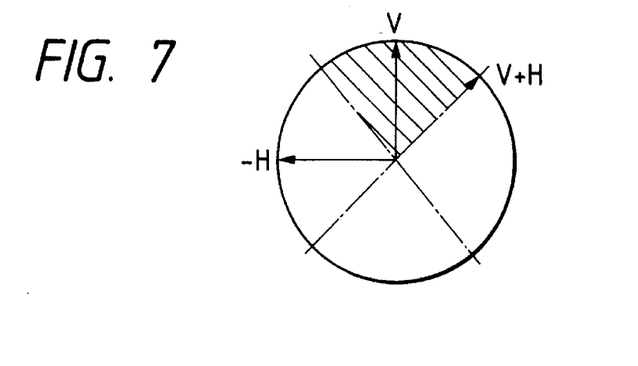
FIG. 7 is a diagram showing another example of division of a binary tree space.
Figure 8:
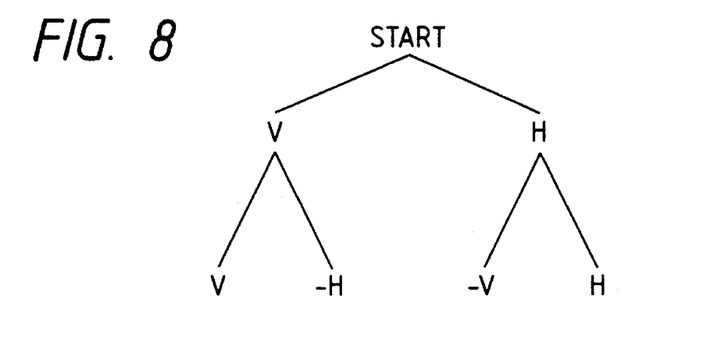
FIG. 8 is a diagram showing an example of a tree of the binary-tree like representative vector set for realizing the space division in FIGS. 6 and 7.

The contents of the representative vector set will be described hereunder. FIGS. 6 and 7 are views each showing an example of division of a binary tree space. FIG. 8 is a view showing an example of a tree of binary tree-like representative vectors for realizing the space division in FIGS. 6 and 7. FIG. 9 is a view showing a tree of a differential vector set which is obtained from the representative vector set in FIG. 8. The reason why vertical and horizontal vectors V and H are used in the first stage in FIGS. 6 and 7 is that the vertical and horizontal vectors V and H are used as the most easily considerable manner because image information may be scanned in any direction, either vertically or transversely, with no problem. Accordingly, in the above case, the "Shape" of the input block 3 can be analyzed by dividing vertically and horizontally the signal space of the image information at first. That is, FIG. 8 shows a binary tree expressing the state in which "Shape" of the applied mean separated block 5 is analyzed. Further, FIG. 9 shows a binary tree-like differential representative vector for performing the analysis like FIG. 8 correspondingly to FIG. 8. For example, in FIG. 8, it is the first-stage vector (V−H) shown in FIG. 9 in which analysis is made as to along which side of the binary tree descending is to be made from START, that is, as to which one of the representative vectors V and H the "Shape" of the supplied mean separated block 5 is nearer.

Referring to FIGS. 6 through 9, the analysis process of the input block will be described. At first, in the first stage, analysis is made as to along which side of the binary tree descending is to be made from START shown in FIG. 8, that is, as to which one of the vertical vector V and the horizontal vector H is nearer. In order to determine the direction, the inner product computation between the inner product of the supplied mean separated block 5 and the differential representative vector (V−H) is performed. In the case where it is concluded that the vertical vector V is near as a result of the inner product computation, analysis is made as to which one of the two vectors V and −H perpendicular to each other is near in the second stage as shown in the binary tree of FIG. 8. At this time, the differential vector to be used for the analysis is such a differential vector (V+H) between the vector V and the vector −H as shown on the left side in the second stage in FIG. 9.

In the case where it is concluded that the supplied mean separated block 5 is near to the vertical vector V through the analysis in the first stage, the input block 3 exists in the slant line portion shown in FIG. 6. The space expressed by the slant line portion is preferably divided by a super-plane shown by a thick one-dotted line in FIG. 6 which is definitely defined by the differential vector (V+H) between the two vectors V and −H perpendicular to each other. For example, in the case where the obtained analysis result shows that the supplied mean separated block 5 is near to the horizontal vector H to thereby descend from START to the right as shown in FIG. 8, the analysis in the second stage is performed by the differential vector −(V+H) between the representative vectors −V and H.

Accordingly, −(V+H) is shown as the differential representative vector on the right side of the second stage in FIG. 9. Thus, the binary tree of the differential representative vectors is symmetrical between left and right sides each having a positive and negative signs different from each other, so that it suffices that only the analysis results obtained from the inner product computing portions in the respective stages are held by the index latches 14, 14', . . . , and 14" respectively, so that the memory capacity for the representative vectors can be reduced. FIG. 7 shows an example in which the similar operation is repeated by use of the differential representative vector (V+H) to thereby divide the slant line portion in FIG. 6 into a space V and a space −H so that the input block 3 is classified into the space (the slant portion) of the vector V.

Figure 10:
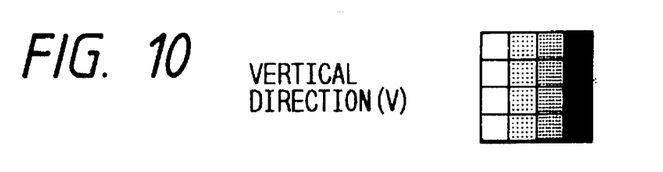
FIG. 10 is a diagram showing a shape example of a representative vector defined as the vertical direction showing a two-dimensional directional component of an image in the case of k=4 and l=4.
Figure 11:
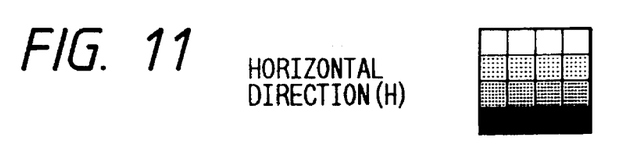
FIG. 11 is a diagram showing a shape example of a representative vector defined as the horizontal direction showing the two-dimensional directional component of an image in the case of k=4 and l=4.
Figure 12:
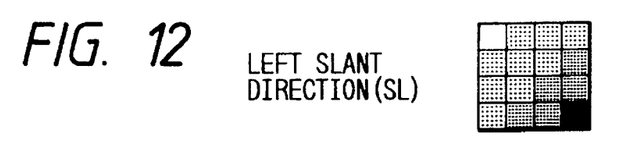
FIG. 12 is a diagram showing a shape example of a representative vector defined as the left slant direction showing the two-dimensional directional component of an image in the case of k=4 and l=4.
Figure 13:
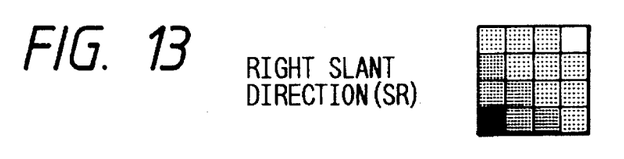
FIG. 13 is a diagram showing a shape example of a representative vector defined as the right slant direction showing the two-dimensional directional component of an image in the case of k=4 and l=4.
Figure 15:
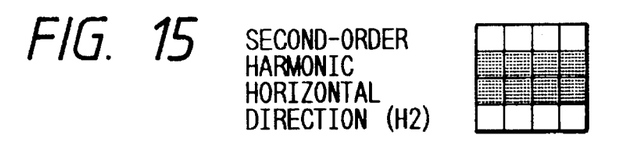
FIG. 15 is a diagram showing a shape example of the representative vector defined as the second-order horizontal direction showing the two-dimensional directional component of an image in the case of k=4 and l=4.

FIG. 10 is a view showing a shape example of a representative vector defined as the vertical direction showing a two-dimensional directional component of an image in the case of k=4 and l=4. FIG. 11 is a view showing a shape example of a representative vector defined as the horizontal direction showing the two-dimensional directional component of an image in the case of k=4 and l=4. FIG. 12 is a view showing a shape example of a representative vector defined as the left slant direction showing the two-dimensional directional component of an image in the case of k=4 and l=4. FIG. 13 is a view showing a shape example of a representative vector defined as the right slant direction showing the two-dimensional directional component of an image in the case of k=4 and l=4. FIG. 14 is a view showing a shape example of a representative vector defined as the second-order vertical direction showing the two-dimensional directional component of an image in the case of k=4 and l=4. FIG. 15 is a view showing a shape example of the representative vector defined as the second-order horizontal direction showing the two-dimensional directional component of an image in the case of k=4 and l=4. In FIGS. 10 through 15, pixels having high density express that pixel values are high, and white and black pixels inverted in density express the directions opposite to each other (a sign "−" is added) respectively.

As an example, in the case of n=6, the "Shape" analysis of the input block 3 is carried out with the left and right slant vectors SR and SL, the second-order harmonic horizontal and vertical vectors V2 and H2, in addition to the horizontal and vertical vectors V and H, as the representative vectors. The shape of the representative vectors can be defined as shown in FIGS. 10 through 15. The second-order harmonic is a harmonic in which values of components are not monotonously increased/decreased in a vector but increased/decreased twice as shown in FIGS. 14 and 15. The horizontal and vertical vectors V2 and H2 of the second-order harmonics orthogonally cross any of the horizontal and vertical vectors V and H and the left and right slant vectors SR and SL, In the case of using the above representative vectors, accordingly, the "Shape" of the input block 3 is analyzed with 32 kinds of the representative vectors. That are, the 32 kinds is obtained by a combination of the above 2 representative vectors with 16 kinds of representative vectors, that is, a combination of the four kinds of V, H, SR, and SL and the four kinds of the negative signed V, H, SR, and SL.

Although it has been assumed that n=6 in the above embodiment, n may be any other integer with an effect equivalent to that of the above embodiment. Further, although the space division has been performed with respect to the vertical vector V and the horizontal vector H in the first stage of the binary tree in the above embodiment, the division may be performed with respect to the right slant vector SR and the left slant vector SL cross perpendicularly to each other, or the second-order harmonic vertical vector V2 and the second-order harmonic horizontal vector H2, in the first stage with an effect equivalent to that of the above embodiment. According to the present invention, the vectors for the analysis can be repeatedly used only through simple operation such as exchange of a sign or the like, so that a storage portion can be realized with a configuration in which a set of differential representative vectors are not prepared for every stage but one storage portion is used repeatedly. According to the present invention, a binary tree-like differential representative vector set to be used for the "Shape" analysis is constituted by differential vectors which are differences between normalized vectors of means separated from vectors having vertical and horizontal space directivity. Accordingly, the differential representative vectors are easily matched to the input block, and the analysis in the first stage of the binary tree can be executed by one inner product computation between the mean separated block and the differential representative vector set. Further, the capacity of the storage means can be reduced, because as the differential representative are set to be used for the analysis in the following stage, it is possible to determine whether the differential representative set stored in the storage means may be used as it is or after multiplied by a negative number, in accordance with the sign of the result of the inner product computation.

What is claimed is:

1. An image signal analyzing system comprising:
   a block extracting means for sequentially extracting blocks including a predetermined number of pixels from an input image;
   a storage means for storing a set of differential representative vectors, each obtained from a difference between representative vectors at a same stage of a binary tree having a plurality of stages of said representative vectors;
   a plurality of stages of inner product computing means for performing computation of inner products between said extracted blocks and said respective differential representative vectors of said plurality of stages; and
   an inner product result holding means for holding results of said inner products obtained for every stage of said binary tree by said inner product computing means, as an index expressing a shape of said input image.

2. The image signal analyzing system of claim 1 wherein a set of representative vectors obtained by establishing representative vectors of the first and second stages so as to show two desired orthogonal directions expressing a spatial direction of said input image to thereby produce representative vectors of the succeeding stages, are used as the set of representative vectors to be stored in the form of a difference in every stage of said binary tree in said storage means.

3. The image signal analyzing system of claim 2 wherein said two orthogonal directions are vertical and horizontal directions, respectively.

4. The image signal analyzing system of claim 2 wherein said two orthogonal directions are left-inclined and right-inclined directions, respectively.

5. The image signal analyzing system of claim 2 wherein said two orthogonal directions are vertical and horizontal directions of second-order harmonic respectively, in which no values of components in vectors increase monotonously but increase and decrease twice.

6. The image signal analyzing system of claim 1 wherein representative vectors produced to establish a symmetrical relationship between two representative vectors in each stage are used, only one of the two representative vectors in said symmetrical relationship in each stage being stored in the form of a difference, in said storage means.

7. The image signal analyzing system of claim 1 further comprising a selection means for selectively reading from said storage means a differential representative vector to thereby obtain an operator of an inner product of said inner product computing means in a certain stage in accordance with an inner product result held by said inner product result holding means in the next stage.

8. The image signal analyzing system of claim 7 further comprising a generation and input means for generating a differential representative vector to be supplied to an input of said inner product computing means in said next stage on the basis of a differential representative vector on one side of said symmetrical relationship read selectively from said storage means by said selection means, and for supplying the thus generated differential representative vector into the input of said inner product computing means in the next stage.

9. The image signal analyzing system of claim 8 wherein said generation and input means for supplying said inner product computing means in the next stage is arranged so that:

in the case where said differential representative vector on one side of said symmetrical relationship read from said storage means is one of two symmetrical differential representative vectors in the symmetrical relationship which can be selected as a differential representative vector for said next stage as it is, said generation and input means supplies said differential representative vector as it is as a differential representative vector of the next stage to said inner product computing means; and in the case where said read differential representative vector is the other one of said two symmetrical differential representative vectors, said generation and input means multi plies said read differential representative vector by a negative number, and then supplies the result of multiplication as a differential representative vector into said inner product computing means in the next stage.

10. An image signal analyzing system of claim 1 wherein when inner products between mean separated block and said n stages of a differential representative vector set are computed by said inner product computing means, representative vectors constituting said differential representative vector set are defined to be vectors of a shape having a predetermined stepwise gradient, and values of elements of a required representative vector are approximated by a power of 2.

11. An image signal analyzing system of claim 2 wherein when inner products between mean separated block and said n stages of a differential representative vector set are computed by said inner product computing means, representative vectors constituting said differential representative vector set are defined to be vectors of a shape having a predetermined stepwise gradient, and values of elements of a required representative vector are approximated by a power of 2.

\* \* \* \* \*